(12) United States Patent
Roemer et al.

(10) Patent No.: US 11,933,367 B2
(45) Date of Patent: Mar. 19, 2024

(54) ROTARY COUPLING

(71) Applicant: Grammer Ag, Amberg (DE)

(72) Inventors: Michael Roemer, Altdorf (DE); Ulrich Hohl, Heilbronn (DE)

(73) Assignee: GRAMMER AG, Ursensollen (DE)

( * ) Notice: Subject to any disclaimer, the term of this patent is extended or adjusted under 35 U.S.C. 154(b) by 968 days.

(21) Appl. No.: 16/765,499

(22) PCT Filed: Nov. 23, 2018

(86) PCT No.: PCT/DE2018/000344
§ 371 (c)(1),
(2) Date: Aug. 28, 2020

(87) PCT Pub. No.: WO2019/101257
PCT Pub. Date: May 31, 2019

(65) Prior Publication Data
US 2020/0400195 A1 Dec. 24, 2020

(30) Foreign Application Priority Data
Nov. 23, 2017 (DE) .......................... 102017010844.7

(51) Int. Cl.
*F16D 1/108* (2006.01)
(52) U.S. Cl.
CPC .................................. *F16D 1/108* (2013.01)
(58) Field of Classification Search
CPC .......... F16D 1/108; F16D 1/072; B23P 11/00; F16B 39/10; F16B 39/282
See application file for complete search history.

(56) References Cited

U.S. PATENT DOCUMENTS

| 8,783,995 B2 | 7/2014 | Besler |
| 9,233,576 B2 | 1/2016 | Dudkowiak et al. |
| 2006/0199652 A1 | 9/2006 | Fuhrmann |
| 2007/0068764 A1 | 3/2007 | Charbonneau |
| 2015/0316092 A1 | 11/2015 | Meier |

FOREIGN PATENT DOCUMENTS

| CN | 107061522 A | 4/2017 |
| DE | 102010048674 U | 4/2012 |
| DE | 202012004119 U1 | 7/2012 |
| DE | 102013225861 A1 | 6/2015 |

OTHER PUBLICATIONS

Machine Translation of CN107061522, espacenet, created Aug. 21, 2023 (Year: 2017).*

* cited by examiner

*Primary Examiner* — Daniel J Wiley
(74) *Attorney, Agent, or Firm* — Andrew Wilford

(57) ABSTRACT

The invention relates to a device comprising a first component (11) and a second component (12). The first component (11) comprises a cylindrical outer surface (13), and the second component (12) comprises a cylindrical inner surface (17) which is arranged on the outer surface (13) coaxially with a longitudinal central axis (m). First connection surfaces of the first component interact with second connection surfaces of the second component in order to prevent a relative rotational movement of the components (11, 12). The invention is characterized in that one of the connection surfaces forms a remaining toothing (22), and the other connection surface forms mutually spaced longitudinal protrusions (18) which are distributed over the circumference and the tooth flanks of which extend parallel to the longitudinal central axis (m).

12 Claims, 4 Drawing Sheets

ROTARY COUPLING

CROSS REFERENCE TO RELATED APPLICATIONS

This application is the US-national stage of PCT application PCT/DE2018/000344 filed 23 Nov. 2018 and claiming the priority of German patent application 102017010884.7 itself filed 23 Nov. 2017.

FIELD OF THE INVENTION

The invention relates to a rotary coupling, in particular a nonslip torque-transmitting coupling.

BACKGROUND OF THE INVENTION

A coupling of this kind has a first component and a second component. The first component has a cylindrical outer surface and the second component has a cylindrical inner surface, and the outer surfaces are coaxial to a longitudinal central axis of the inner surface, thereby forming a rotationally fixed connection, with the outer surface and the inner surface forming interacting connection formations.

A coupling of this kind is known from DE 20 2012 111 124 B3 (US 2015/0316092). In this coupling, a crankshaft is fitted together of parts. Crank pins comprise fastening portions having teeth extending axially, wherein the fastening portion is pressed into a receiving opening of a crank cheek. The cross-section of the fastening portion projects, in regions, beyond the inside cross-section of the associated receiving opening.

DE 10 2010 048 674 A1 describes a side gear that has a form-fitting, frictional or integral connection between a teeth part and a hub part. The connection can be formed for example by a press-fit connection, by an unroundness of the recess of the toothed part and of the complementary hub part, or by intermeshing teeth.

In particular in the case of connection partners having different expansion coefficients, the problem arises that, in the case of unfavorable temperature ratios, the outside diameter of the pin is expanded to such an extent that the part provided with the recess is destroyed, or the inside diameter of the recess expands to such an extent that the play between the first and the second part becomes so great that a reliable transmission of movement is not ensured.

OBJECT OF THE INVENTION

The object of the invention was that of providing a coupling having a rotationally fixed connection, in which both the risk of material strain owing to differing material expansion, and the risk of a lack of force transmission between the first component and the second component is reduced.

SUMMARY OF THE INVENTION

The outer surface or the inner surface is formed with retaining teeth, the tooth flanks of which for example extend axially, i.e. parallel to the longitudinal central axis, and the other of the connection formations is formed with longitudinal projections that are distributed over the periphery and are mutually spaced. The longitudinal projections extend for example in a direction parallel to the longitudinal central axis of the component. At least one component is for example rotationally symmetrical. For example, the component having the cylindrical outer surface is formed with the retaining teeth and interacts with longitudinal projections that are formed on the component that has the cylindrical inner surface. According to an alternative embodiment, the retaining teeth is on the outer surface, and the longitudinal projections are on the inner surface.

According to one embodiment, mutually spaced transverse projections are distributed on the periphery, which transverse projections extend both radially and angularly, and prevent relative axial movement of the parts. The axial extension may be small, for example between 1 and 3 mm.

One embodiment of the invention is characterized in that the longitudinal projections and/or the transverse projections have a greater hardness than the retaining teeth. In accordance with the radial dimensional overlap with respect to the longitudinal central axis, upon mounting the softer material of the retaining teeth is deformed by the harder material.

One embodiment of the invention is characterized in that the retaining teeth is formed of a plastics material. The plastics material may for example be a polyoxymethylene (POM).

One embodiment is characterized in that the longitudinal projections extend over a smaller length relative to the teeth of the teeth. In this way, it is possible for the longitudinal projections to deform the adjacent material of the teeth, such that material bulges of the material of the teeth form adjacently to the longitudinal projections, as a result of which a relative movement between the two components is prevented, both in the rotational direction and in the axial direction. In particular, if the teeth is formed of plastics material, indentations form.

A further embodiment is designed such that a root diameter of the retaining teeth is smaller than a tip diameter of the longitudinal projections and/or of the transverse projections. In the event of the material being expanded significantly, by heating, the material then still has sufficient free space in order to deform radially, in particular expand, and the pressure on the revel of the recess is not so great that a temperature change can lead to damage to the material.

The transverse projection is formed for example on the end of the longitudinal projection.

The longitudinal projection is between two tooth flanks of adjacent teeth of the teeth. In this case, a longitudinal central axis of each longitudinal projection is arranged so as to be parallel to the longitudinal central axes of the adjacent teeth.

BRIEF DESCRIPTION OF THE DRAWING

Further advantages of the invention are clear from an embodiment shown schematically in the drawings, in which.

SPECIFIC DESCRIPTION OF THE INVENTION

Figure 1:
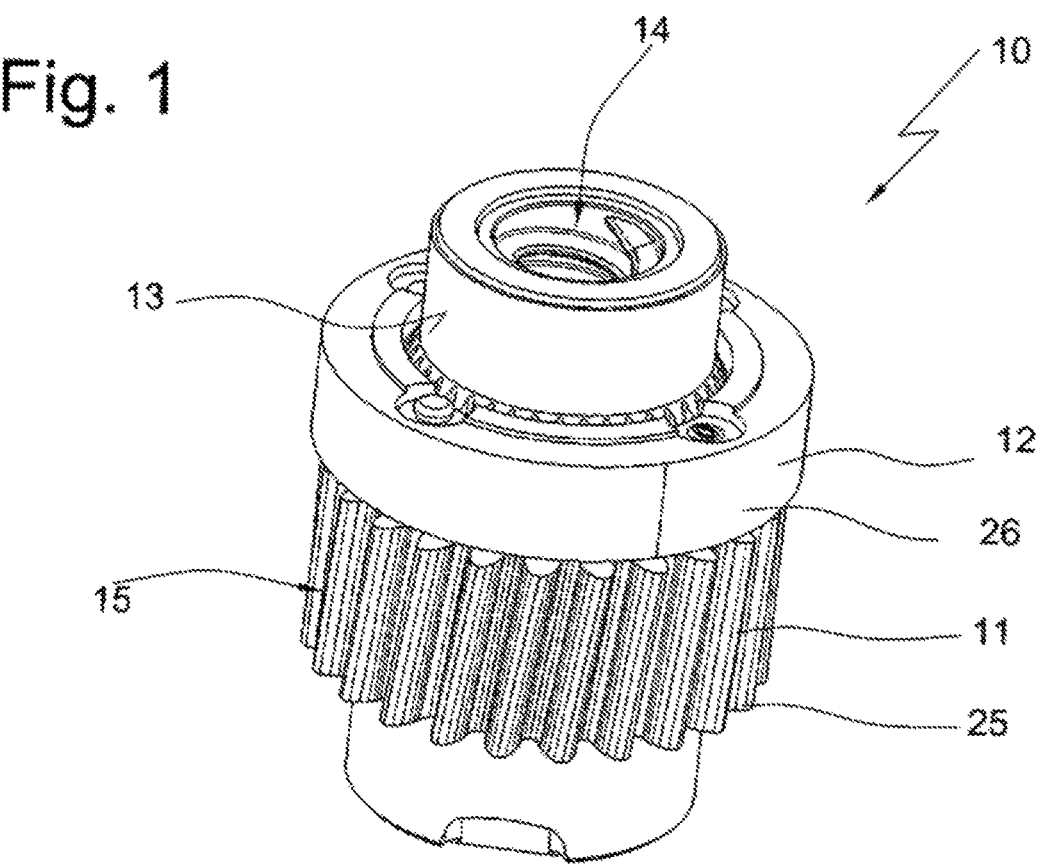
FIG. 1 is a perspective view of the coupling comprising a spindle nut and a magnet ring on an outer surface of the spindle nut.

The coupling as a whole is denoted by reference numeral 10 in the drawings. Identical reference numerals in the different figures denote the same parts, even if small letters follow or are omitted.

According to FIG. 1, the coupling 10 has a first component 11 and a second component 12. In the present embodiment, the first component 11 is a spindle nut 25 for driving a threaded spindle. The second component 12 is a magnet ring 26. The spindle nut 25 is made of plastic, in this case polyoxymethylene, and the magnet ring 26 is made of a hard ferrite. The magnet ring 26 is coaxial to a longitudinal central axis m of the spindle nut 25, on a toothed region of an outer surface 13 of the spindle nut 25.

In the prior art, the problem arose that, owing to different expansion coefficients of the components 11 and 12, the expansion of the spindle nut 25 exceeded that of the magnet ring 26, such that, in the case of a change in temperature, the magnet ring 26 cracked or so much play was formed that secure retention of the magnet ring 26 was not ensured. For example in the automotive industry, reliable functioning in a temperature range of from −40° to 80° Celsius is required.

Figure 2:
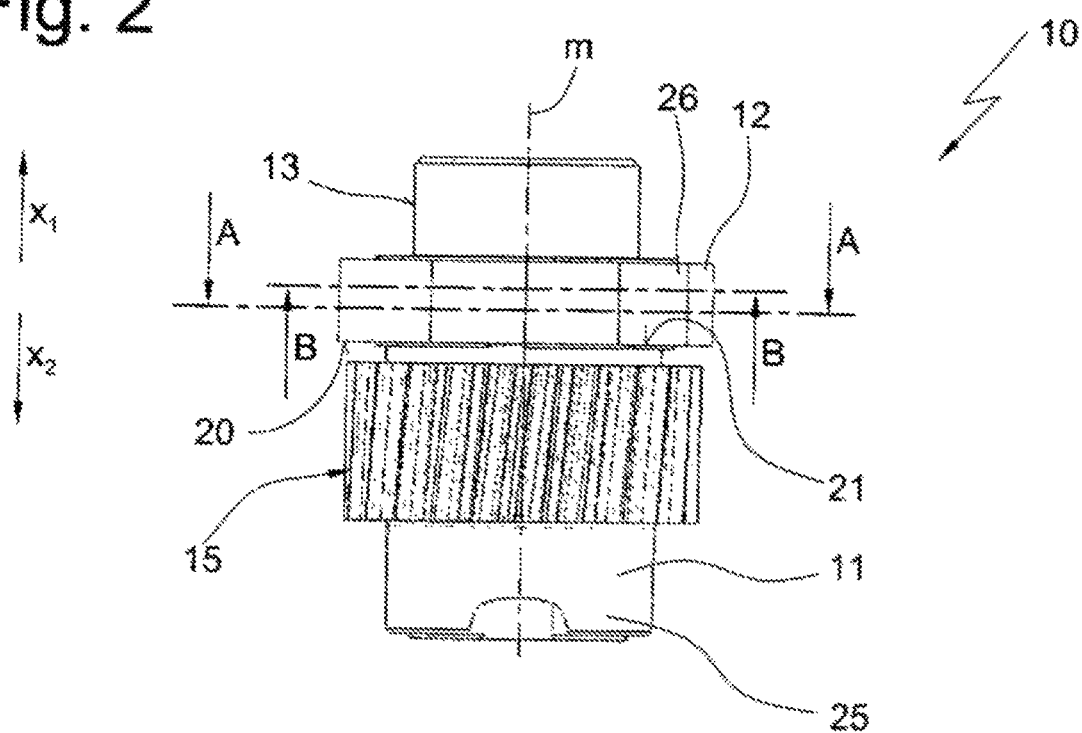
FIG. 2 is a side view of the coupling according to FIG. 1.

An internal thread 14 provided for driving the threaded spindle can be seen in a throughgoing coaxial hole in FIG. 1. External teeth 15 are formed on the outer surface of the spindle nut 25 that connect the spindle nut 25 to an electrical drive. The side view according to FIG. 2 shows section lines A and B that extend perpendicular to the central axis m. The spindle nut 25 is formed with a shoulder surface 21. An end face 20 of the magnet ring 26 rests on the shoulder surface 21 of the spindle nut 25.

Figure 3:
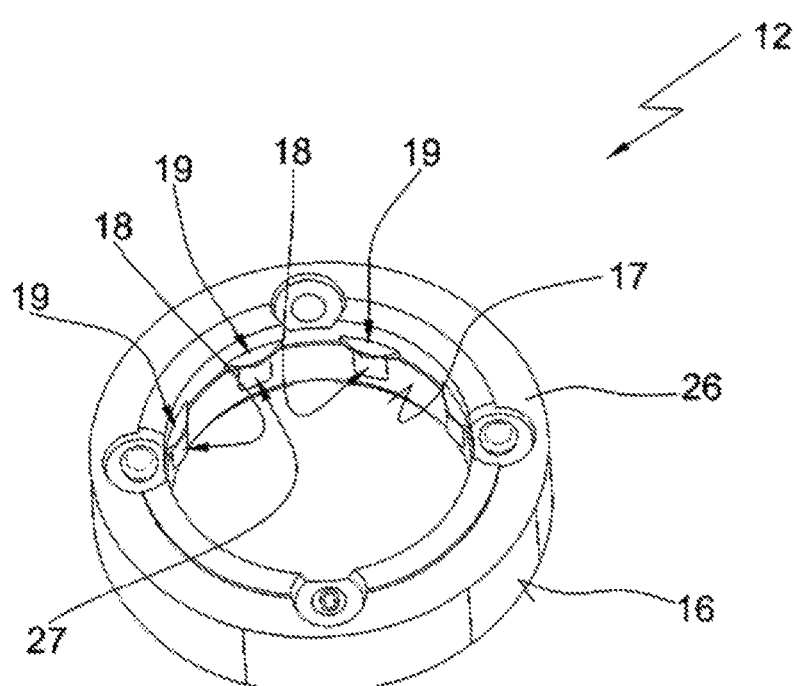
FIG. 3 is a perspective view of the magnet ring of the coupling.

FIG. 3 is a perspective view of the magnet ring 26. It is cylindrical and has an inner surface 17 coaxial to the outer surface 16. Eight longitudinal projections 18 are formed on the inner surface 17 that are distributed so as to be at a uniform spacing around the periphery. A transverse projection 19 is formed on an end of each longitudinal projection 18. However, the number of longitudinal projections 18 and transverse projections 19 can deviate therefrom, and can be selected depending on requirements.

Flanks of each longitudinal projection 18 extend parallel to the longitudinal central axis m. Flanks of the transverse projection 19 also extend over a small length parallel to the longitudinal central axis m. In other words, the transverse projections 19 are discoid. With respect to the longitudinal projections 18, the transverse projections 19 project further radially toward the longitudinal central axis m, and extend angularly.

Figure 4:
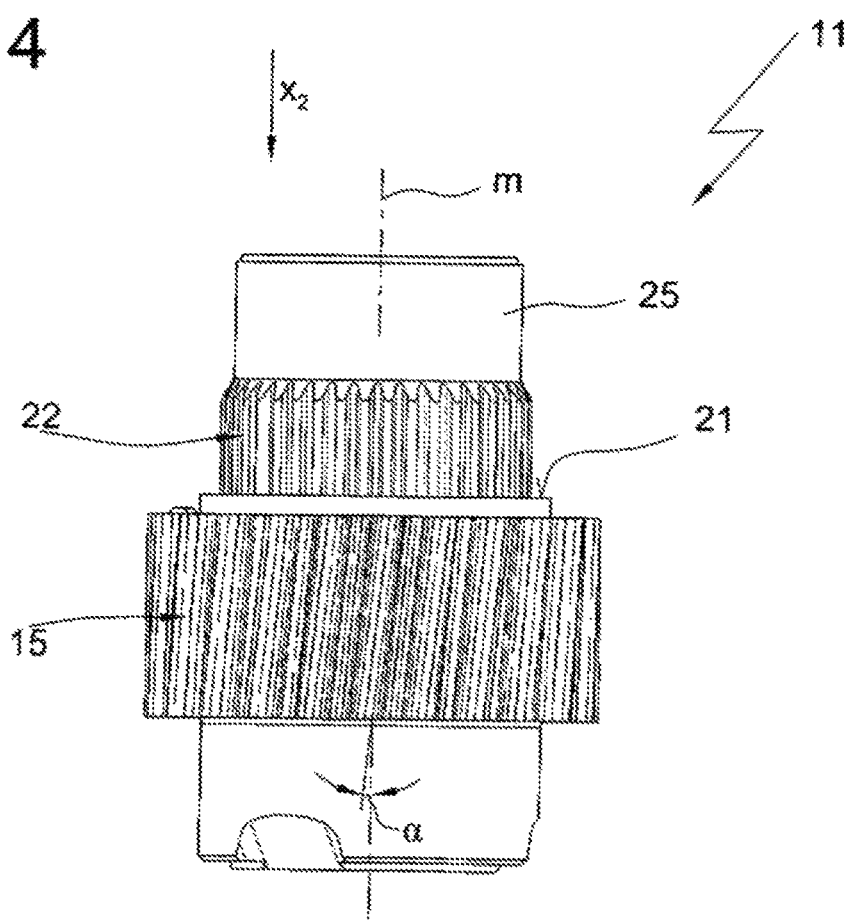
FIG. 4 is a side view of the spindle nut prior to mounting the magnet ring.

FIG. 4 is a side view of the spindle nut 25. The spindle nut 25 has a region provided with the external teeth 15. The external teeth 15 whose flanks each form an angle a with the longitudinal central axis m. Retaining teeth 22 extend from the surface 21 that is formed by a shaft shoulder. The tooth flanks of the retaining teeth 22 extend parallel to the longitudinal central axis m.

Figure 5:
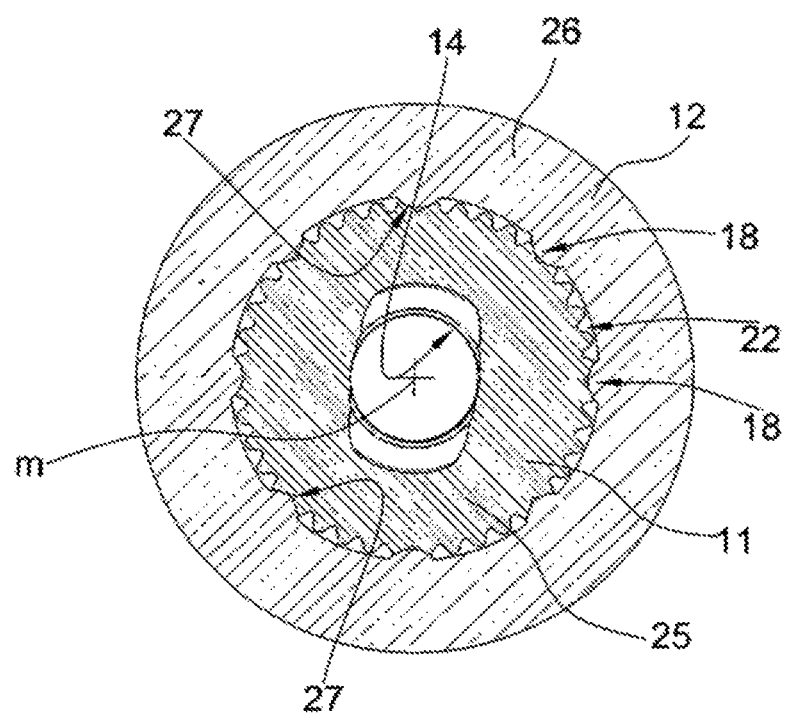
FIG. 5 is a sectional view according to section line A-A in FIG. 2.

FIG. 5 is a cross-sectional view according to the section line A-A, where the section is through the longitudinal projections 18. It can be seen in FIG. 5 that the head 27 of each longitudinal projection 18 fits between two adjacent retaining teeth 22. In other words, longitudinal central axes of the longitudinal projections 18 are between longitudinal central axes of the respective adjacent retaining teeth. It can furthermore be seen that a tip diameter of the longitudinal projections 18 is greater than a root diameter of the retaining teeth 22, with reference to the longitudinal central axis m.

Figure 6:
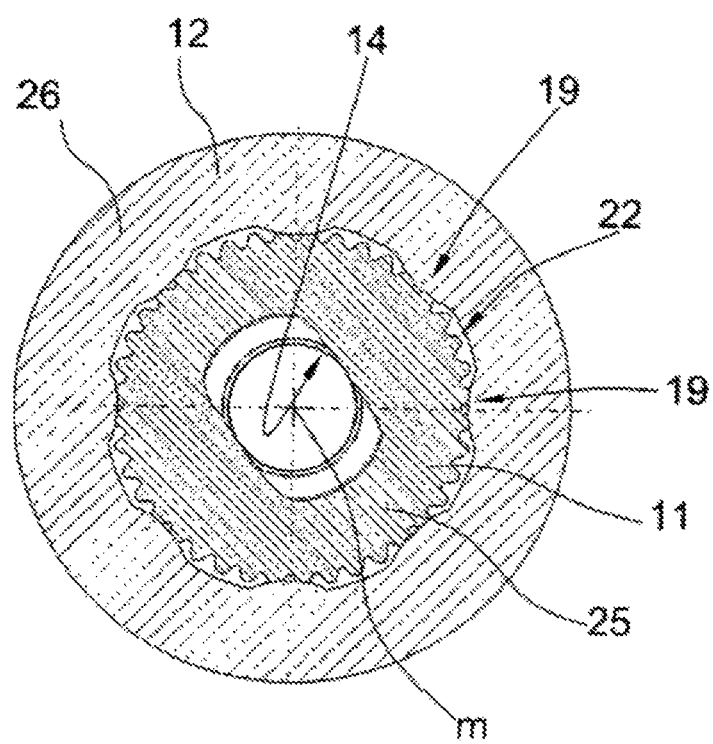
FIG. 6 is a sectional view according to section line B-B in FIG. 2.

FIG. 6 shows a section according to the section line B-B through the transverse projections 19. A tip diameter of the transverse projections 19 is also greater than a root diameter of the retaining teeth 22, with reference to the longitudinal central axis m. Owing to the difference between the root diameter and the tip diameter of the longitudinal projections 18 or the transverse projections 19, in the event of a change in temperature, for example upon heating, additional radial deformation of the retaining teeth 22 into the gaps may occur. This prevents the pressure on the magnet ring 26 from becoming so great in the event of too great a strain on the spindle nut 25 that the magnet ring 26 cracks.

Figure 7:
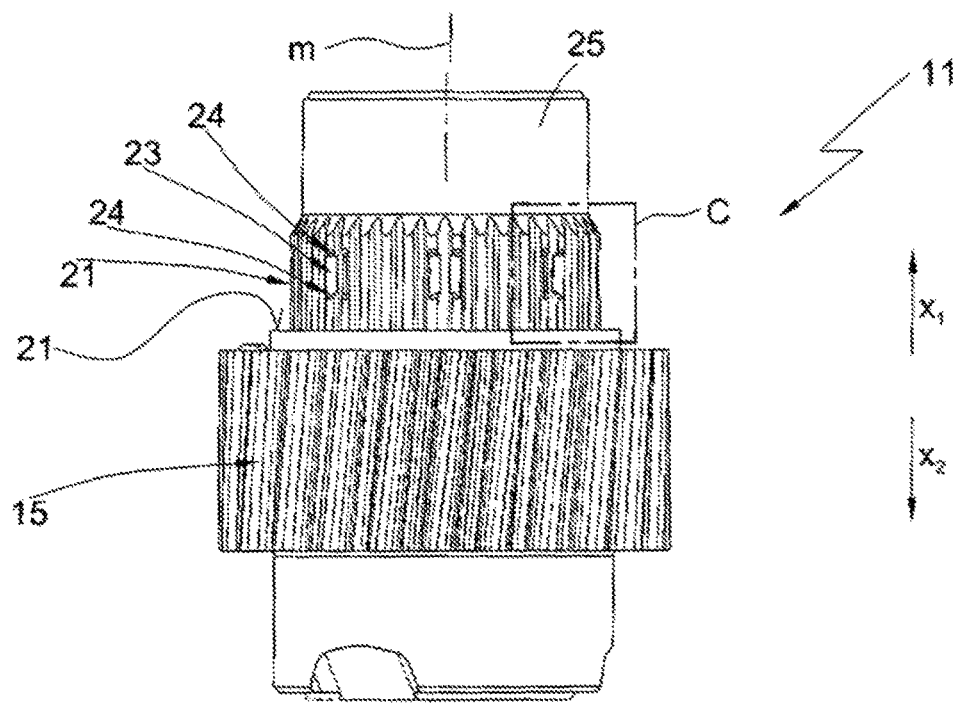
FIG. 7 is a side view of the spindle nut after mounting the magnet ring.
Figure 8:
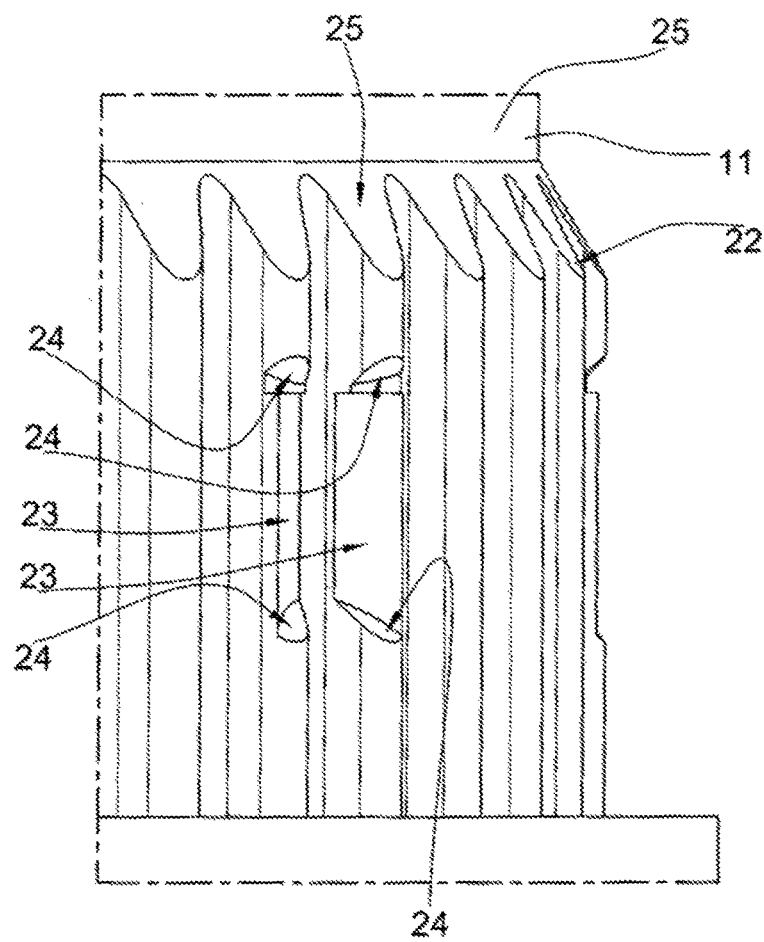
FIG. 8 is an enlarged view according to detail C in FIG. 7.

Since the material of the magnet ring 26 is harder than the material of the spindle nut 25, indenting of the plastic occurs, as shown in FIGS. 7 and 8 that show the spindle nut 25 without the magnet ring 26. Indentations 23 resulting from deformation by the longitudinal projections 18, and indentations 24 resulting from deformation by the transverse projections 19. The indentations 23 are abutment surfaces that are designed such that they prevent relative rotation of the magnet ring 26 and the spindle nut 25 about the longitudinal central axis m. The indentations 24 are abutment surfaces that prevent relative movement between the magnet ring 26 and the spindle nut 25, parallel to the longitudinal central axis m in the direction $x_1$ and $x_2$.

It is clear in FIGS. 7 and 8 that the indentations 23 that constitute an impression of the longitudinal projections 18 are shorter than the retaining teeth 22 parallel to the longitudinal central axis m. It can likewise be seen that the indentations 24 that constitute an impression of the transverse projections 19 are between an end 25 of a tooth and an end formed by the shoulder surface 21 of the tooth of the retaining teeth 22.

The magnet ring 26 is mounted by being pushed onto the spindle nut 25 in the direction $x_2$ (see FIG. 2). In this case, the teeth first deform merely elastically, and plastic deformation occurs at the location of the seat of the magnet ring 26 only in the longer term. Proceeding from the plastic deformation, in the event of extreme temperature constellations, additional deformation of the softer material may occur, such that an overstress of the magnet ring 26 cannot occur.

In contrast, in the event of material shrinkage owing to low temperatures, the connection cannot be released, since the form-fitting connection cannot be released owing to the interaction between the retaining teeth 22 with the longitudinal projections 18 and the transverse projections 19.

The invention claimed is:
1. A coupling comprising:
a first component having a cylindrical outer surface;
a second component having a cylindrical inner surface coaxial to a longitudinal central axis of the outer surface of the first component;
first connection formations on the first component;
second connection formations on the second component and interacting with the first connection formations to prevent relative rotation of the components,
retaining teeth forming one of the connection formations;
longitudinal projections forming the other of the connection formations, distributed over a periphery thereof, mutually spaced, and extend parallel to the longitudinal central axis; and transverse projections formed on the other connection formation and mutually spaced and distributed over the periphery thereof so as to prevent relative axial movement of the components.

2. The coupling according to claim 1, wherein the longitudinal projections are, relative to the longitudinal central axis, of a smaller length than the retaining teeth.

3. The coupling according to claim 1, wherein the retaining teeth extend parallel to the longitudinal central axis.

4. The coupling according to claim 1, wherein the longitudinal projections and/or the transverse projections are harder than the retaining teeth.

5. The coupling according to claim 1, wherein a root diameter of the retaining teeth is smaller than a tip diameter of the longitudinal projections and/or of the transverse projections.

6. The coupling according to claim 1, wherein a respective one of the transverse projections is formed on end of each of the longitudinal projections.

7. The coupling according to claim 1, wherein the retaining teeth are formed of plastic.

8. The coupling according to claim 1, wherein a longitudinal central axis of each longitudinal projection is angularly between longitudinal central axes of two teeth of the retaining teeth.

9. The coupling according to claim 1, wherein the first component and the second component have different components of thermal expansion.

10. The coupling according to claim 1, wherein the first component is a spindle nut and the second component is a ring.

11. The coupling according to claim 1, wherein the longitudinal projections extend axially on and project radially from the other connection formation.

12. A coupling comprising:
a first component having a cylindrical outer surface;
a second component having a cylindrical inner surface coaxial to a longitudinal central axis of the outer surface of the first component, the first and second components having different coefficients of thermal expansion;
first connection formations on the first component;
second connection formations on the second component and interacting with the first connection formations to prevent relative rotation of the components,
retaining teeth forming one of the connection formations;
longitudinal projections forming the other of the connection formations, distributed over a periphery thereof, mutually spaced, and extend parallel to the longitudinal central axis, the longitudinal projections being harder than the retaining teeth.

* * * * *